United States Patent [19]

List et al.

[11] 4,033,183

[45] July 5, 1977

[54] HORIZONTAL- AND VERTICAL-ROLL FORCE MEASURING SYSTEM

[75] Inventors: Harold A. List; Jack H. Baker, both of Bethlehem, Pa.; Jack Joyce, Westford, Mass.

[73] Assignee: Bethlehem Steel Corporation, Bethlehem, Pa.

[22] Filed: Oct. 8, 1976

[21] Appl. No.: 730,927

[52] U.S. Cl. .......................... 73/88.5 R; 73/133 R
[51] Int. Cl.² ...................... G01L 1/22; G01B 7/18
[58] Field of Search .......... 73/88.5 R, 133 R; 72/8, 72/19

[56] References Cited

UNITED STATES PATENTS

| 2,322,418 | 6/1943 | Crawford | 73/88.5 R |
| 2,659,154 | 11/1953 | Rendel | 73/88.5 R |
| 2,756,589 | 7/1956 | Zeitlin et al. | 73/88.5 R |
| 3,241,360 | 3/1966 | Curry | 73/147 |
| 3,791,204 | 2/1974 | List | 73/88.5 R |

*Primary Examiner*—Charles A. Ruehl
*Attorney, Agent, or Firm*—Joseph J. O'Keefe; John I. Iverson; George G. Dower

[57] ABSTRACT

One set of four extensometers bolted onto opposite faces of two mill posts of a universal rolling mill stand are responsive to a total site strain caused by simultaneous application of horizontal- and vertical-roll forces in the mill stand. Extensometer output signals are corrected individually for a variable zero drift component. The four zero-corrected signals are resolved to provide simultaneous indications of sum and differences of horizontal-roll forces in the two mill posts, the same indications for the vertical-roll forces, and selective individual site and post strains.

10 Claims, 7 Drawing Figures

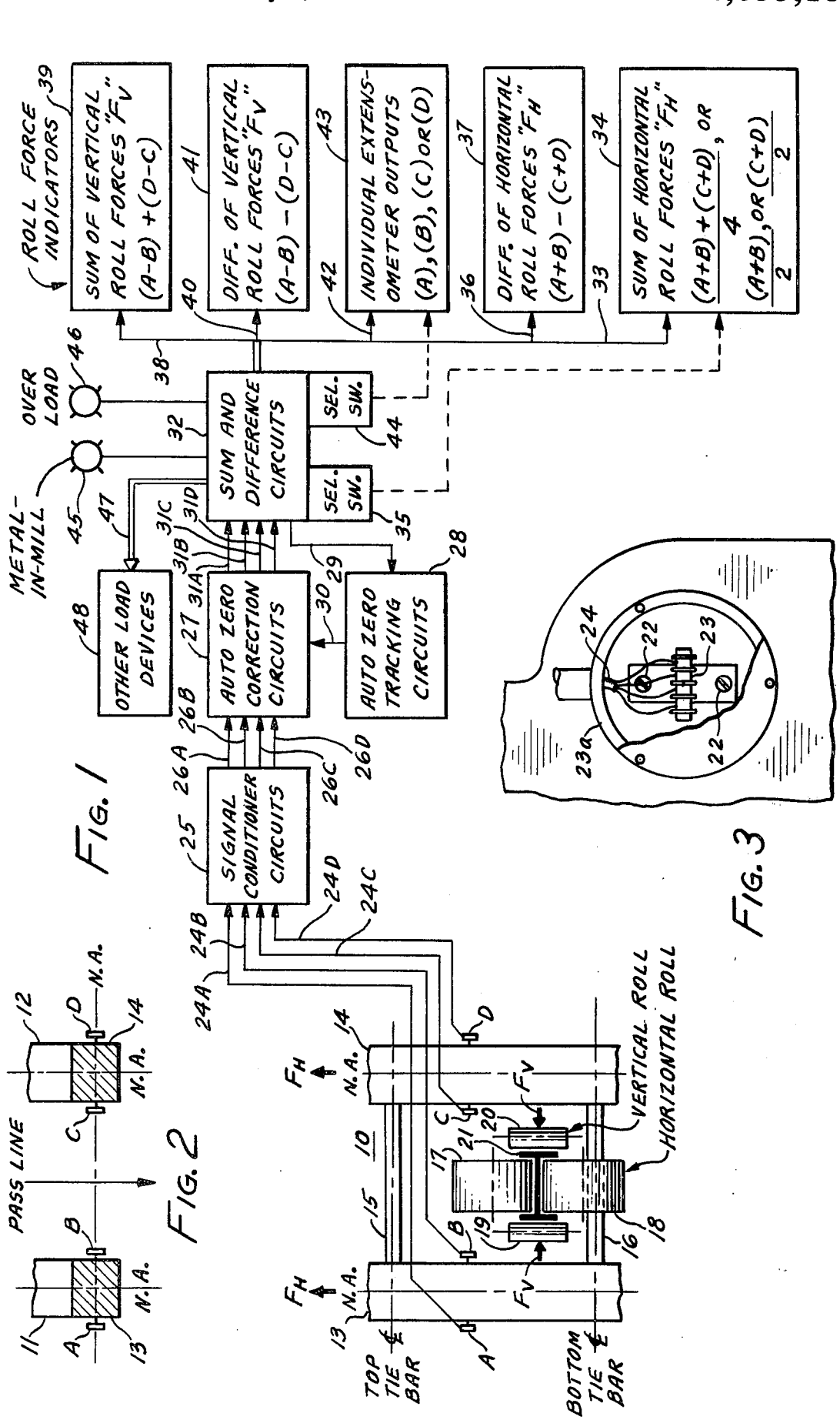

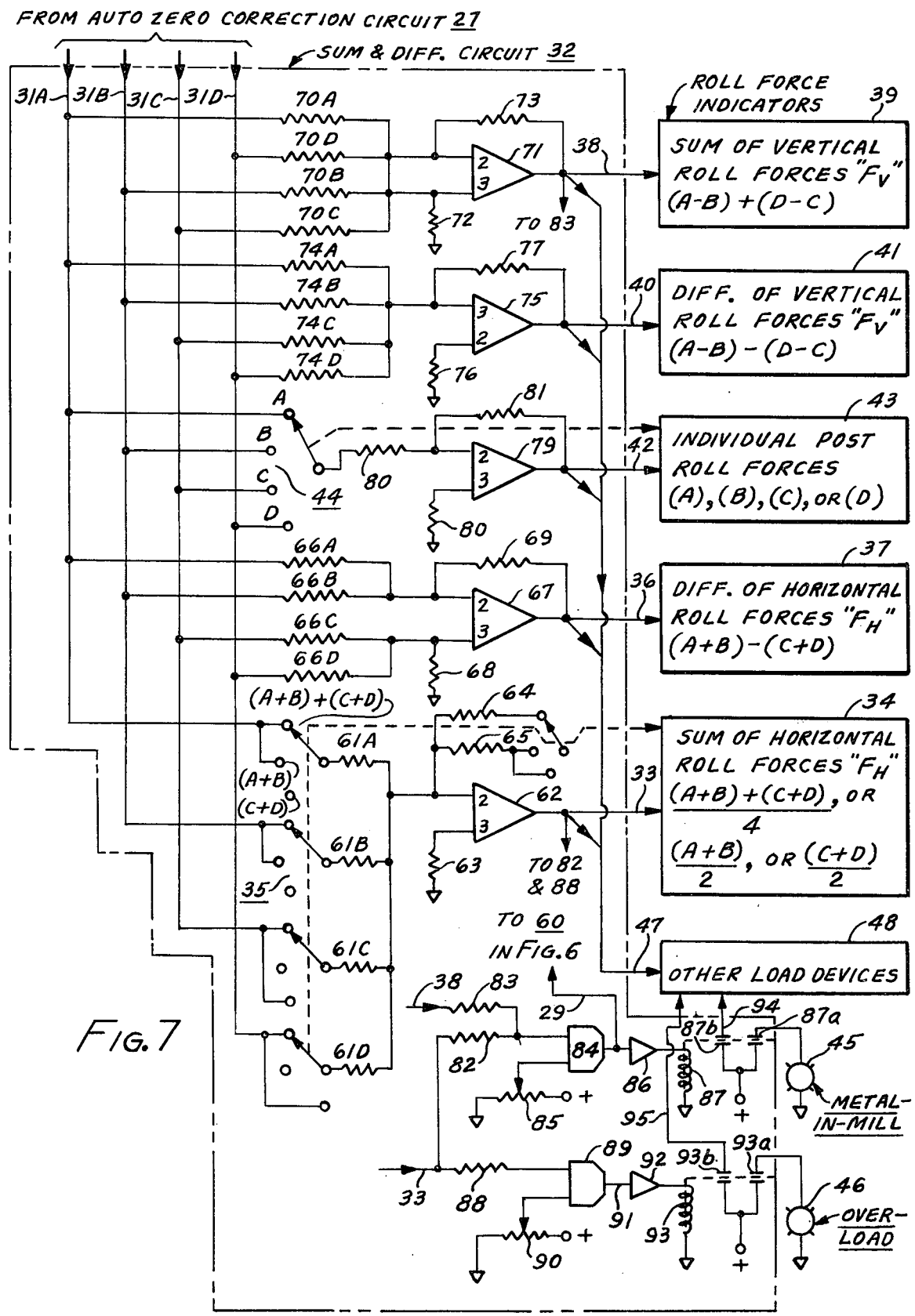

HORIZONTAL- AND VERTICAL-ROLL FORCE MEASURING SYSTEM

BACKGROUND OF THE INVENTION

1. Field of the Invention

This invention relates broadly to improved force measuring apparatus. More particularly, this invention relates to apparatus for measuring horizontal- and vertical-roll forces in a universal rolling mill stand.

2. Description of the Prior Art

It is important to operators of both old and new metal rolling mills to known the magnitude of roll forces, and other parameters, that will be present in a mill stand after adjusting work roll gap to ensure a desired reduction of a workpiece during passage through the mill stand. In older mills, mechanical roll gap indicator readings, together with other parameter information, are the only way of ultimately determining the value of roll forces for a given set of operating conditions. Frequently, operating conditions change and produce substantial errors in the roll force so determined. In some newer strip mills for example, simple load cells are incorporated into the mill stand structure at great expense and are connected to remote reading roll force indicator. This indicator enables the operator to read roll forces to certain accuracies, and with constant attention, will enable the operator to prevent overloading of work rolls and mill stand structures.

In universal rolling mills where structural shapes, such as "I" and "H" beams are rolled, the determination of roll forces is a complex matter. This is because mill stands have both horizontally- and vertically-aligned work rolls which produce two kinds of roll forces in mill side frames simultaneously during rolling operations. Hereinafter these two kinds of roll forces will be referred to as horizontal-roll forces $F_H$ and vertical-roll forces $F_V$ and are defined as follows. Horizontal-roll forces $F_H$ act vertically in a mill side frame and are exerted on the workpiece through a pair of horizontally-aligned work rolls by means of a screwdown mechanism which adjusts the vertical gap between these rolls to control one dimension of the structural shape. Vertical-roll forces $F_V$ act horizontally in a mill side frame and are exerted on the workpiece through a pair of vertically-aligned work rolls by a separate screwdown mechanism which adjusts the horizontal gap between these rolls to independently control a second dimensional reduction of the structural shape. Symmetrically shaped workpieces produce substantially equal $F_H$ or $F_V$ roll forces in a pair of end posts of opposing mill side frames. Occasionally, the $F_H$ or $F_V$ roll forces may be unequal in the same pair of end posts due to a special shape being rolled.

Generally, in a universal rolling mill, horizontal-roll forces $F_H$ produce tension stresses in a given pair of mill end posts of opposing mill side frames, while vertical-roll forces $F_V$ produce bending stresses in the same pair of end posts. Whenever roll forces are either equal or unequal, so are corresponding stresses. This simultaneous combination of $F_H$ and $F_V$ roll force stresses produces complex stress patterns in the end posts which are difficult to measure. This measuring difficulty is further compounded by a zero drift component generated by thermal and mechanical operating variations such as mill stand warpage and mill stand hysterisis. Operating variations causing the zero drift component may occur prior to, during and/or between rolling schedules.

It has been discovered that the operating variations causing the zero drift component affect stress patterns at various strain sites on individual mill posts in different ways. At opposite strain sites a given end post the zero drift component at each site may be opposite each other and may drift into an equal or even a reverse condition. Strain sites on another end post may respond differently than the first post at any given time. After sufficient rolling time, the zero drift component may even stabilize at a different value for each strain site on each end post. Consequently, when using strain gages at the end post strain sites in a universal rolling mill, the variable zero drift component also affects the horizontal- and vertical-roll force $F_H$ and $F_V$ zero references in a corresponding way.

Prior art apparatus has limited provisions for measuring only horizontal-roll forces in a rolling mill having only horizontal work rolls. For example, either an electromagnetic or a strain gage type of extensometer was attached to only one surface of a mill post to sense the horizontal-roll force therein, it being heretofore assumed that the horizontal-roll forces in the other post were the same as the first post. The extensometer output signal was connected to a zero drift corrector, using either electromagnetic or electronic means, before being indicated or recorded as roll force.

In a more recent example of prior art, four half-bridge strain gages mounted off-center on opposite sides of two mill posts in a horizontal-only rolling mill. These gages are connected into two full-bridge circuits so that they cancel the effects of bending stresses in the two mill posts. Their output signals represent only horizontal-roll forces in the two mill posts and are electronically corrected for a zero drift component on a per-post basis. Horizontal-roll force signals are selectively connected to means for indicating either the sum of, or individual, mill post roll forces.

Neither of the foregoing prior art arrangements work satisfactorily in a universal rolling mill environment because they fail to provide operating needs in a contemporary mill which may have either old or new rolling mill equipment. That is, they do not provide simultaneous indications of both horizontal- and vertical-roll forces, individual force sensor zero drift correction, nor means for resolving complex stress patterns into relative simple roll force components that will satisfy the needs of universal rolling mill operators.

SUMMARY OF THE INVENTION

One of the objects of this inventon is to provide improved roll force measuring apparatus for use on a universal rolling mill which will overcome the foregoing difficulties.

Another object of this inventon is to provide apparatus for measuring both horizontal- and vertical-roll forces in a universal rolling mill and simultaneously indicating each of these roll forces.

Another object of this invention is to provide apparatus for measuring and indicating horizontal- and vertical-roll forces simultaneously using a minimum of force sensors.

Still another object of this invention is to provide roll force measuring apparatus for a universal rolling mill which accounts for complex zero drift components simultaneously in both horizontal- and vertical-roll forces.

A further object of this invention is to provide reliable and inexpensive apparatus for measuring and indicating both horizontal- and vertical-roll forces simultaneously in either old or new universal rolling mills without requiring mill modifications to use conventional load cells, yet satisfy the needs of operators of such mills.

The foregoing objects can be obtained by a roll force measuring system which uses one set of four extensometers bolted onto opposite faces of two mill posts of a universal rolling mill stand so that each extensometer will be responsive to a total site strain caused by simultaneous application of horizontal- and vertical-roll forces. Each of the four extensometer output signals is individually zero-compensated by first circuit means which corrects for a variable zero drift component associated with a different one of the total strain sites. The four zero-corrected extensometer signals are resolved in second circuit means to provide simultaneous indications of sum and differences of horizontal-roll forces in the two mill posts, the same for the vertical-roll forces, and selective individual site and post strains.

BRIEF DESCRIPTION OF THE DRAWINGS

FIG. 1 is a diagrammatical representation of the universal roll force measuring apparatus of the present invention.

FIG. 2 is a cross-sectional plan view of rolling mill stand posts showing extensometer sites.

FIG. 3 is a typical extensometer installation detail at a strain site.

FIG. 7 is a sum and difference circuit diagram showing the simultaneous resolution of four extensometer signals into horizontal- and vertical-roll forces and selective individual site and post strains.

DESCRIPTION OF THE PREFERRED EMBODIMENT

Figure 4:
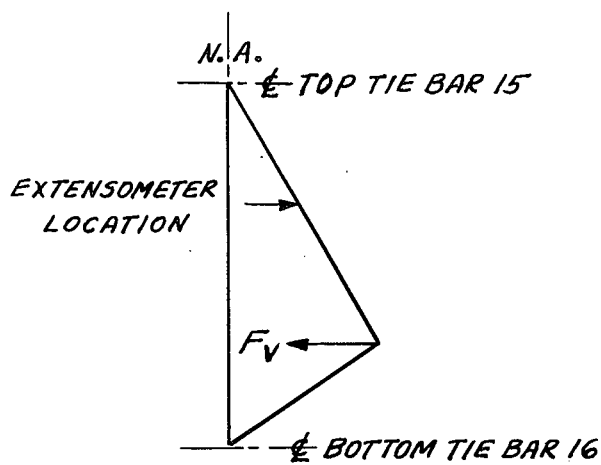
FIG. 4 is a bending moment diagram of one of the posts in the universal rolling mill stand shown in FIG. 1.

Referring now to the drawings, particularly FIG. 1, a conventional universal rolling mill 10, shown in partial end elevation, is equipped with mill side frames 11 and 12 having mill posts 13 and 14 at say the exit end of the mill stand. Mill posts 13 and 14 are stabilized structurally by top and bottom tie rods 15 and 16, respectively. A pair of horizontal work rolls 17 and 18, coacting with a pair of vertical work rolls 19 and 20, simultaneously cause a reduction of I-shaped workpiece 21 in two independent dimensions.

A horizontal screwdown mechanism (not shown) operates to vary the vertical gap between horizontal work work rolls 17 and 18, thereby causing horizontal-roll forces $F_H$ to occur in mill posts 13 and 14. A vertical screwdown mechanism (not shown) operates to vary the horizontal gap between vertical work rolls 19 and 20, thereby causing vertical-roll forces $F_V$ to also occur in mill posts 13 and 14 at the same time as the $F_H$ roll forces.

Horizontal- and vertical-roll forces $F_H$ and $F_V$ cause compound deflections in mill post 13 which in turn cause complex stress patterns to be present in the post structure. These stress patterns are directly related to the $F_H$ and $F_V$ roll forces and are sensed by extensometers A and B. There are similar stress patterns in mill post 14 which are sensed by extensometers C and D mounted on opposing surfaces of mill post 14.

Details of extensometers A, B, C and D are typified in FIG. 3. Here, two studs 22 are welded onto each of two surfaces of mill post 13, as well as each of two surfaces of mill post 14, all at locations shown in FIGS. 1 and 2. A strain sensing element 23 is bolted onto each pair of studs 22. Strain sensing element 23 is preferably a full-bridge semiconductor strain gage circuited and calibrated for tension and compression forces in mill duty prior to bolting onto studs 22. Sensor 23 is enclosed in insulated housing 23a which is suitably secured to the surface of a mill post. Sensor 23 roll force signals are carried by cable 24 through an unidentified conduit to measuring circuitry described below.

It is important that extensometers A, B, C and D be mounted in line at a known distance from top and bottom tie rods 15 and 16 as well as a known distance from the effective location where roll force $F_V$ is applied, all as shown in FIG. 1. In addition, extensometers A and B shown in FIG. 2 must be mounted on mill post 13 surfaces equi-distant from a longitudinally extending neutral axis N.A. Likewise, extensometers C and D must be mounted on mill post 14 equi-distant from another longitudinally extending neutral axis N.A. parallel to that through mill post 13. Moreover, extensometers A, B, C and D must also be located along a common neutral axis N.A. extending laterally through mill posts 13 and 14 and orthogonally to the neutral axes extending longitudinally through mill posts 13 and 14.

By mounting extensometers A, B, C and D at the locations described above, only one set of extensometers are required to simultaneously resolve both horizontal- and vertical-roll forces $F_H$ and $F_V$ from their output signals in circuitry described below. It should be remembered that vertical-roll forces $F_V$ produce bending stresses in mill post 13 and 14, the magnitude of which is determined by the moment arm associated with extensometers A, B, or D, C as shown by the bending moment diagram illustrating mill post 13 in FIG. 4. $F_V$ roll force bending stresses produce tension or positive stresses at extensometers A and D and compression or negative stresses at extensometers B and C.

Figure 5:
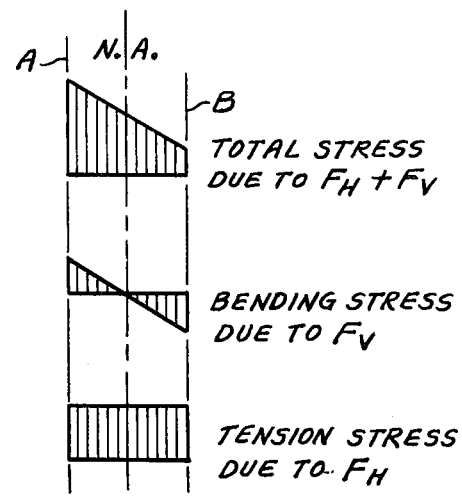
FIG. 5 is a stress diagram of one of the posts in the universal rolling mill stand shown in FIG. 1.

It should also be remembered that horizontal-roll forces $F_H$ produce substantially only tension or positive stresses at extensometers A, B, C and D. Distribution of tension stresses, bending stresses and the total stress is illustrated by the stress diagram for mill post 13 in FIG. 5. Mill post 14 stress distribution is opposite that of mill post 13 with respect to the neutral axis shown in FIG. 5.

Returning to FIG. 1, the output signals from extensometers A, B, C and D, which represent the total stress caused by the combined horizontal- and vertical-roll forces $F_H$ and $F_V$ in mill posts 13 and 14, are fed over respective cables 24A, 24B, 24C and 24D to the signal conditioner circuits 25. Conditioned extensometer output signals are fed over leads 26A, 26B, 26C and 26D to auto zero correction circuits 27. Here each extensometer output signal is individually corrected for the variable zero drift component associated with the above-described mill effects, in addition to electronic zero shift up to this point in the roll force measuring system.

Figure 6:
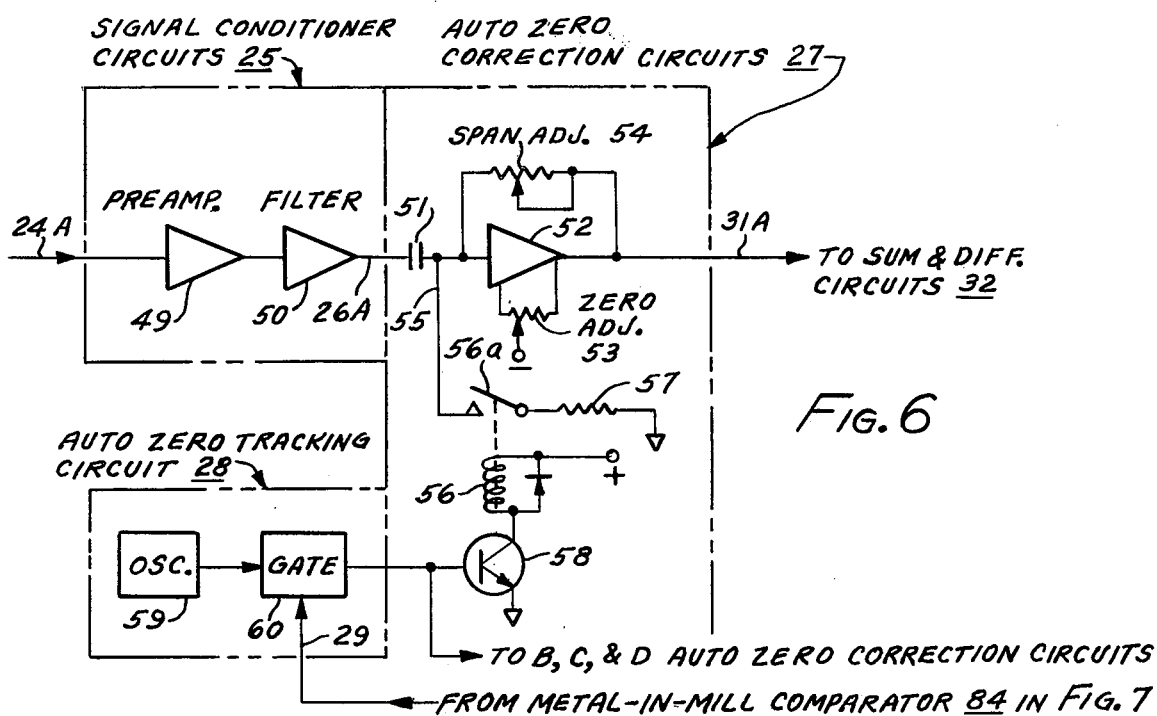
FIG. 6 is a block diagram of typical signal conditioning, zero tracking and zero correction circuits used in the measuring apparatus shown in FIG. 1.

Auto zero tracking circuit 28 operates during the absence of a metal-in-mill signal on lead 29 to apply a zero switching signal over lead 30 to effect a zero correction to each individual extensometer output signal. Zero signal correction is inhibited during the presence of metal-in-mill communicated over lead 29. Circuit diagrams for signal conditioner 25, zero tracking circuit 27 and zero correction circuits 28 are shown in FIG. 6 which is described below.

Four zero-corrected extensometer signals are fed over leads 31A, 31B, 31C and 31D to sum and difference circuits 32, the latter being shown in FIG. 7 and described below. Sum and difference circuits 32 are arranged to simultaneously resolve the four zero-corrected extensometer signals into five different roll force indications which are particularly useful to a universal rolling mill operator.

A first output signal from sum and difference circuits 32 is fed over lead 33 to indicator 34 which indicates the sum of horizontal-roll forces $F_H$ defined as $[(A+B) + (C+D)]/4$, or $(A+B)/2$, or $(C+D)/2$ extensometer signals. Roll force $F_H$ indication is controlled by a 3-position selector switch 35. The first reading on indicator 34 indicates to the mill operator the total horizontal-roll force $F_H$ being applied to workpiece 21. The second and third readings on indicator 34 indicate to the mill operator the horizontal-roll force $F_H$ is mill posts 13 and 14. These readings enable the operator to determine the individual forces $F_H$ on side frame 11 and 12.

A second output signal from circuits 32 is fed over lead 36 to indicator 37 which indicates the difference of horizontal-roll forces $F_H$ defined as $(A+B)-(C+D)$ extensometer signals. When workpiece 21 is symmetrical, the reading on indicator 37 should be zero. Any other reading indicates to the mill operator the existence of an unbalanced horizontal-roll force load in mill posts 13 and 14 which may be due to uneven roll wear or a misaligned pass line. When workpiece 21 is assymetrical, the horizontal-roll forces $F_H$ in posts 13 and 14 are normally unbalanced according to a predetermined relationship.

A third output signal from circuits 32 is fed over lead 38 to indicator 39 which indicates the sum of vertical-roll forces $F_V$ as defined by $(A-B)+(D-C)$ extensometer signals. A fourth output signal from circuits 32 is fed over lead 40 to indicator 41 which indicates the difference of vertical-roll forces $F_V$ as defined by $(A-B)-(D-C)$ extensometer signals. The sum and difference of vertical-roll forces $F_V$ on indicators 39 and 41, respectively, have a meaning to the mill operator that corresponds to the sum and difference of horizontal-roll force $F_H$ indicators 34 and 37 described above.

A fifth output signal from circuits 32 is fed over lead 42 to indicator 43 which indicates extensometer output signals A, B, C or D as determined by a four-position selector switch 44. Each of these readings indicates to the mill operator the total roll force load at any strain site, or a malfunction in an extensometer.

Thus, it will be seen that both horizontal- and vertical-roll forces $F_H$ and $F_V$ are resolved simultaneously in sum and difference circuits 32 from the one set of extensometers A, B, C and D mounted on universal rolling mill posts 13 and 14.

Still referring to FIG. 1, sum and difference circuits 32 also detects metal-in-mill which is communicated over lead 29 as well as being signalled on alarm light 45. In addition, circuits 32 also detect a roll force overload and signal this overload on alarm light 46. Provisions are also made for feeding any number of the five indicated horizontal- and vertical-roll force sums and differences, as well as individual post signals, over bus 47 to other load devices 48 such as recorders or a computer. All of these additional features are detailed in the description of FIG. 7 below.

Turning now to FIG. 6, there is shown an A channel signal conditioning circuit 25 and auto zero correction circuit 27 associated with extensometer A. Each of the B, C and D channels are duplicates of A, thereby providing four independent channels of extensometer signal conditioning and auto zero correction. Auto zero tracking circuit 28 feeds a zero switching signal over lead 30 to each of the A, B, C and D channels, thereby energizing all zero correction circuits 27 at the same time.

In regards to signal conditioner circuit 25, the extensometer A output signal is fed over cable 24A to preamplifier 49, through active filter 50 and outputed on lead 26A. Also included, but not shown, is a D.C. power supply for energizing the extensometer A strain gage bridge also by way of cable 24A.

The auto zero correction circuit 27 compensates for the zero drift component associated with the conditioned extensometer A output signal as well as electronic zero shift. As mentioned above, the zero drift component may be caused by variations in ambient temperature at the extensometer strain gate site, by ambient thermal variations of the entire mill stand 10, or by localized heating and cooling effects caused by periodic movement of hot workpiece 21 while being drawn through work rolls 17–20. The magnitude of zero drift component of extensometer A may be in the same order as that of D, but the magnitude of zero drift component of extensometers B and C are of the same order as each other but substantially higher for most of the time then that of extensometers A and D. Additional zero drift component is caused by mechanical variations in mill 10 hysterisis which is active with mill load changes and may at times be additive to the thermal variations and at other times subtractive, or even drift to a zero effect during mill inactivity.

Regardless of what causes the variable zero drift component, the conditioned extensometer A output signal on lead 26A is applied to capacitor 51 which couples this signal to the input of electronic zeroing amplifier 52. Electrical zero for channel A is set by zero adjuster 53. Amplifier 52 gain is set by span adjuster 54 so that the output on lead 31A is scaled in relation to the bending moment associated with extensometer A as shown in FIG. 4. These same zeroing and scaling procedures also apply to channels B, C and D.

Ordinarily, amplifier 52 would amplify whatever signal content is coupled to it by capacitor 51, including a roll force signal plus a variable zero drift component. The zero drift component is compensated for, either incrementally or continuously as described below, by connecting the amplifier input side of capacitor 51 through lead 55, relay contact 56a and resistor 57 to ground. Relay contact 56a is closed by relay coil 56 for the duration that transistor 58 base receives a positive zero switching pulse fed over lead 30 from auto zero tracking circuit 28. The positive pulse on lead 30 signifies the absence of metal-in-mill communicated over lead 29. Closure of relay contact 56a grounds capacitor 51 which not only resets amplifier 52 output on lead 31A to zero, but zeroes all roll force indicators simultaneously.

Only one auto zero tracking circuit 28 is provided for use with all zero correction circuits 27. This includes a free running oscillator 59 having about a 2 Hz. output signal which is fed through control gate 60 and outputed on lead 30. When control gate 60 receives a positive pulse on lead 29, signifying the absence of metal in mill 10, gate 60 is energized and sends a 2 Hz. positive pulse over lead 30 to the base of transistor 58, thus causing the auto zeroing circuits 27 to be activated. When control gate 60 does not receive a pulse on lead 29, thereby signifying the absence of metal in mill 10, gate 60 and transistor 58 are inhibited, thereby inhibiting auto zeroing circuits 27 for the duration metal is in mill 10.

Suitable values of R and C for resistor 57 and capacitor 51 will enable auto zeroing functions to be performed incrementally at 2Hz. rates over a period of about three cycles. This time interval is preferred for some roll force measuring systems but may be shortened for others by reducing the value of resistor 57. By eliminating resistor 57 entirely, the auto zeroing function occurs on the oscillator first cycle.

Alternatively, the auto zeroing functions may be performed continuously instead of incrementally by eliminating the auto zero correction and tracking circuits 27 and 28 and substituting therefor switched integrators as shown by List et al in U.S. Pat. No. 3,791,204.

Referring now to FIG. 7, sum and difference circuits 32 resolve all of the zeroed extensometer signals on leads 31A, 31B, 31C and 31D into the horizontal- and vertical-roll force $F_H$ and $F_V$ output signals as mentioned above. Sum of the horizontal-roll forces $F_H$ is mill posts 13 and 14 is achieved by placing selector switch 35 in the (A+B)+(C+D) position. Here extensometer signals on leads 31A, 31B, 31C and 31D are connected through corresponding summing resistors 61A, 61B, 61C and 61D to a summing junction at the summing input of operational amplifier 62. The difference input to amplifier 62 is connected through resistor 63 to ground. Amplifier 62 gain is set at divide-by-4 by feedback resistor 64 and the output on lead 33 is read on roll force $F_H$ indicator 34.

Sum of the horizontal-roll forces $F_H$ in mill post 13 or 14 is achieved by placing selector switch 35 either in the (A+B) or (C+D) positions. Extensometer signals on leads 31A and 31C are connected through summing resistors 61C and 61D, alternately to the summing input of amplifier 62. Divide-by-2 feedback resistor 65 is substituted for feedback resistor 64 in both instances so that the output fed over lead 33 to roll force $F_H$ indicator 34 is the same scale as the sum of the four extensometer signals when selector switch 35 is in the first position.

Difference of the horizontal-roll forces $F_H$ between mill posts 13 and 14, that is (A+B)−(C+D), is achieved by connecting the extensometer signals on leads 31A and 31B through corresponding summing resistors 66A and 66B to a summing junction at the summing input of operational amplifier 67. Extensometer signals on leads 31C and 31D are connected to corresponding summing resistors 66C and 66D to a summing junction at the differencing input of amplifier 67. The differencing input is grounded through resistor 68. Feedback resistor 69 is sized so that amplifier 67 output on lead 36 is properly scaled to read on roll force $F_H$ indicator 37.

Sum of the vertical-roll forces $F_V$ in mill posts 13 and 14, that is (A−B)+(D−C), is achieved by connecting the extensometer signals on leads 31A and 31D through corresponding summing resistors 70A and 70D to a summing junction at the summing input of operational amplifier 71. Extensometer signals 31B and 31C are connected through corresponding summing resistors 71B and 71C to a summing junction at the differencing input of amplifier 71. The differencing input of amplifier 71 is grounded through resistor 12. Feedback resistor 73 is sized so that amplifier 72 output on lead 38 is properly scaled to read on roll force $F_V$ indicator 39.

Difference of vertical-roll force $F_V$ between mill posts 13 and 14, that is (A−B)−(D−C), is achieved by connecting the extensometer signals on leads 31A, 31B, 31C and 31D through corresponding summing resistors 74A, 74B, 74C and 74D to a summing junction at the differencing input to operational amplifier 75. The summing input of amplifier 75 is grounded through resistor 76. Feedback resistor 77 is sized so that amplifier 75 output on lead 40 is properly scaled to read on roll force $F_V$ indicator 41.

Individual outputs of extensometer signals 31A, 31B, 31C and 31D are connected sequentially by way of respective positions of selector switch 44 through resistor 78 to the summing input of operational amplifier 79. The differencing input of amplifier 79 is grounded through resistor 80. Feedback resistor 81 is sized so that amplifier 79 output on lead 42 is properly scaled to read on indicator 43.

The metal-in-mill signal mentioned above is also detected in sum and difference circuits 32. This signal is generated by combining the sum of horizontal-roll forces $F_H$ signal at output lead 33 and the sum of vertical-roll forces $F_v$ signal at output lead 38 through respective summing resistors 82 and 83 at a junction of one input to comparator 84. The other input of comparator 84 is connected to a reference voltage divider 85. Divider 85 is set so that approximately 3–5% of full scale of either the sum of horizontal-roll forces $F_H$ or the sum of vertical-roll forces $F_V$ will cause comparator 84 to change state.

Normally, comparator 84 output on lead 29 is a positive pulse when there is an absence of metal in mill 10. When the sum of either horizontal- or vertical-roll forces exceeds the predetermined value, thereby affording burnout protection for the other, comparator 84 changes state and the absence of a positive pulse on lead 29 indicates that metal is in mill 10. It is this signal on lead 29 that controls gage 60 to cause auto zero tracking circuit 28 in FIG. 6 to produce the zero switching pulse for auto zero correction on lead 30 as described above.

Comparator 84 output on lead 29 is inverted in amplifier 86 so that relay 87 will be energized when metal is detected in mill 10. Relay contact 87a closes and energizes metal-in-mill alarm indicator 45.

The roll force overload signal mentioned above is also detected in sum and difference circuits 32. This signal is detected by comparing the sum of horizontal-roll force signal on lead 33 through resistor 88 in comparator 89 with a reference signal in source 90. Source 90 is adjusted so that comparator 89 output will go from high to low when the sum of horizontal-roll forces $F_H$ exceeds a predetermined overload. Comparator 89 output on lead 91 is inverted by amplifier 92 so that relay 93 will be energized when the sum of horizontal-roll forces $F_H$ exceeds the predetermined overload.

Relay contact 93a closes and energizes overload alarm indicator 46.

In addition to the foregoing functions, sum and difference circuits 32 also feed the following signals over bus 47 to other load devices 48, such as recorders and a computer. If desired, an additional deck may be added on selector switch 35 to provide corresponding position signals to other load devices 48. Sum of horizontal-roll present $F_H$ present on lead 36. The sum and difference of horizontal-roll forces $F_H$ present on lead 36. The sum and differences of vertical-roll forces present on leads 38 and 40. The four individual extensometer output signals present sequentially on lead 42. If desired, an additional deck may be added on selector switch 44 to provide corresponding position signals to other load devices. Metal-in-mill signal from relay contact 87b fed over lead 94, as well as roll force overload signal from relay contact 93b fed over lead 95, are also fed to other load devices 48.

Thus, it has been shown that both horizontal- and vertical-roll forces in a universal rolling mill may be sensed by only one set of four extensometers on two mill posts and their output signals individually zeroed and resolved to simultaneously indicate both horizontal- and vertical-roll forces.

We claim:

1. Apparatus for measuring horizontal- and vertical-roll forces exerted on a workpiece in a universal rolling mill, comprising:
   a. first, second, third and fourth extensometer means adapted to be mounted in pairs along a common neutral axis on opposing strain sites on first and second rolling mill posts, each said extensometer means having a separate output signal which varies proportional to the total strain at a given strain site as a function of horizontal-roll force, vertical-roll force and a zero drift component,
   b. first circuit means responsive to a zero switching signal for automatically and independently zeroing each extensometer output signal to correct for the zero drift component associated with a given site,
   c. second circuit means for resolving the four zeroed extensometer output signals into simultaneous horizontal- and vertical-roll force signals associated with both said mill posts, said second circuit means adapted to produce said zero switching signal during the absence of the workpiece in said mill, and
   d. means for utilizing the signals from the second circuit means to simultaneously determine horizontal- and vertical-roll forces in said universal rolling mill.

2. The apparatus of claim 1 wherein the second circuit means is adapted to produce the sum of horizontal-roll forces as a function of summing the four extensometer output signals.

3. The apparatus of claim 1 wherein the second circuit means is adapted to produce horizontal-roll forces as a function of summing two of the extensometer output signals associated with a given mill post.

4. The apparatus of claim 1 wherein the second circuit means is adapted to produce the difference of horizontal-roll forces as a function of the sum of the third and fourth extensometer signals subtracted from the sum of the first and second extensometer signals.

5. The apparatus of claim 1 wherein the second circuit means is adapted to produce the sum of the vertical-roll forces as a function of difference between the first and second extensometer output signal added to the difference between the fourth and third extensometer output signals.

6. The apparatus of claim 1 wherein the second circuit means is adapted to produce the difference of the vertical-roll forces as a function of the difference between the first and second extensometer output signals subtracted from the difference between the fourth and third extensometer output signals.

7. The apparatus of claim 1 wherein the second circuit means is adapted to selectively produce any one of the extensometer output signals.

8. The apparatus of claim 1 wherein the second circuit means is adapted to produce an overload signal whenever one of the horizontal- or vertical-roll forces exceed a predetermined limit.

9. The apparatus of claim 1 wherein the first circuit means is adapted to zero an extensometer output signal incrementally.

10. The apparatus of claim 1 wherein the first circuit means is adapted to zero an extensometer output signal continuously.

* * * * *

UNITED STATES PATENT AND TRADEMARK OFFICE
CERTIFICATE OF CORRECTION

PATENT NO. : 4,033,183
DATED : July 5, 1977
INVENTOR(S) : Harold A. List et al.

It is certified that error appears in the above-identified patent and that said Letters Patent are hereby corrected as shown below:

Col. 2, line 6, after the word "sites" the word --on-- should be inserted.

Col. 5, line 24, "is" should read --in--.

Col. 6, line 27, "gate" should read --gage--.

Col. 7, line 33, "is" should read --in--.

Col. 7, line 48, after the word "resistors" insert the following: --61A and 61B, or leads 31C and 31D are connected through summing resistors--.

Col. 9, line 9, after the word "on" the following should be inserted --33. The difference of horizontal-roll forces $F_H$ present on lead 36.--

Signed and Sealed this

Twenty-seventh Day of January 1981

[SEAL]

Attest:

RENE D. TEGTMEYER

Attesting Officer

Acting Commissioner of Patents and Trademarks